(12) United States Patent
Roberts

(10) Patent No.: US 11,386,209 B2
(45) Date of Patent: Jul. 12, 2022

(54) STATIC SOURCE CODE SCANNER

(71) Applicant: ADP, Inc., Roseland, NJ (US)

(72) Inventor: Aaron Roberts, Columbus, OH (US)

(73) Assignee: ADP, Inc., Roseland, NJ (US)

(*) Notice: Subject to any disclaimer, the term of this patent is extended or adjusted under 35 U.S.C. 154(b) by 459 days.

(21) Appl. No.: 16/657,198

(22) Filed: Oct. 18, 2019

(65) Prior Publication Data

US 2021/0117547 A1  Apr. 22, 2021

(51) Int. Cl.
*G06F 21/57* (2013.01)
*G06F 8/41* (2018.01)
*G06F 8/60* (2018.01)
*G06F 8/70* (2018.01)

(52) U.S. Cl.
CPC .......... *G06F 21/577* (2013.01); *G06F 8/41* (2013.01); *G06F 8/60* (2013.01); *G06F 8/70* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 9,361,094 B1 | 6/2016 | Xie et al. | |
| 9,632,771 B2 | 4/2017 | Toub | |
| 11,074,154 B2* | 7/2021 | Mitchell | G06F 11/3624 |
| 11,200,144 B1* | 12/2021 | Cook | G06F 11/3608 |
| 2003/0065976 A1* | 4/2003 | Bennett | G06F 11/3624 |
| | | | 714/E11.215 |
| 2013/0326479 A1* | 12/2013 | Russell | G06F 8/70 |
| | | | 717/121 |
| 2014/0068588 A1* | 3/2014 | Tan | G06F 8/656 |
| | | | 717/169 |
| 2018/0018459 A1* | 1/2018 | Zhang | G06F 21/566 |
| 2020/0004519 A1* | 1/2020 | Ryall | G06F 8/71 |

OTHER PUBLICATIONS

Anderson, "The Use and Limitations of Static-Analysis Tools to Improve Software Quality," CrossTalk: The Journal of Defense Software Engineering, Jun. 2008, pp. 18-21.

* cited by examiner

*Primary Examiner* — Lewis A Bullock, Jr.
*Assistant Examiner* — Mark A Gooray
(74) *Attorney, Agent, or Firm* — Yee & Associates, P.C.

(57) ABSTRACT

A computer implemented method for scanning source code files included in an application. A source code scanner identifies an assembly generated from a set of source code files. The assembly comprises assembly code and assembly metadata. The source code scanner identifies a file path for each source code file identified from the assembly. The file path is identified within the assembly metadata. Responsive to identifying the file paths from the assembly metadata, the source code scanner identifies the set of source code files within a code repository. The source code scanner scans the set of source code files to identify potential code vulnerabilities in the set of source code files. The scan omits files in the code repository that were not identified within the assembly metadata.

21 Claims, 7 Drawing Sheets

STATIC SOURCE CODE SCANNER

BACKGROUND

1. Field

The disclosure relates generally to computer systems and, more specifically, to methods, computer systems, and a computer program product for automatically limiting the scope of static source code scans based on deployed files.

2. Description of the Related Art

Source code files are typically scanned on a regular basis. However, source code repositories often contain many files that are never part of the deployment. Any scan of the extraneous code may produce unnecessary findings. Filtering through these findings is a manual process, requiring the time and attention of the developers. This "noise" can often distract from the real issues that need to be addressed in the deployed software.

Therefore, it would be desirable to have a method and apparatus that take into account at least some of the issues discussed above, as well as other possible issues. For example, it would be desirable to have a method and apparatus that overcome a technical problem with automatically limiting the scope of static source code scans based on deployed files.

SUMMARY

An embodiment of the present disclosure provides a computer system for scanning source code files included in an application. The computer system comprises a hardware processor and a metadata-scoped code scanner, in communication with the hardware processor. The metadata-scoped code scanner is configured to identify an assembly generated from a set of source code files. The assembly comprises assembly code and assembly metadata. The metadata-scoped code scanner is configured to identify a file path for each source code file identified from the assembly. The file path is identified within the assembly metadata. The metadata-scoped code scanner is further configured to identify the set of source code files within a code repository, in response to identifying the file paths from the assembly metadata. The metadata-scoped code scanner is further configured to scan the set of source code files to identify potential code vulnerabilities in the set of source code files. The scan omits files in the code repository that were not identified within the assembly metadata. A functionality of the computer is improved by omitting others of the set of source code files that were not identified based on the file list.

Yet another embodiment of the present disclosure provides a method for scanning source code files included in an application. The method includes identifying an assembly generated from a set of source code files. The assembly comprises assembly code and assembly metadata. The method further includes identifying a file path for each source code file identified from the assembly. The file path is identified within the assembly metadata. The method further includes, responsive to identifying the file paths from the assembly metadata, identifying the set of source code files within a code repository. The method further includes scanning the set of source code files to identify potential code vulnerabilities in the set of source code files. The scan omits files in the code repository that were not identified within the assembly metadata. A functionality of the computer is improved by omitting others of the set of source code files that were not identified based on the file list.

Another embodiment of the present disclosure provides a computer program product for scanning source code files included in an application. The computer program product comprises a computer-readable storage media and program code stored in the computer-readable storage media. The program code includes code for identifying an assembly generated from a set of source code files. The assembly comprises assembly code and assembly metadata. The program code includes code for identifying a file path for each source code file identified from the assembly. The file path is identified within the assembly metadata. The program code includes code for identifying the set of source code files within a code repository in response to identifying the file paths from the assembly metadata. The program code includes code for scanning the set of source code files to identify potential code vulnerabilities in the set of source code files. The scan omits files in the code repository that were not identified within the assembly metadata. A functionality of the computer is improved by omitting others of the set of source code files that were not identified based on the file list.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that it would be desirable to have a method, apparatus, system, and program code that overcome a technical problem with automatically limiting the scope of static source code scans based on deployed files.

Thus, illustrative embodiments provide a method, apparatus, and system for scanning source code files included in an application. In one illustrative embodiment, a metadata-scoped code scanner is configured to identify an assembly generated from a set of source code files. The assembly comprises assembly code and assembly metadata. The metadata-scoped code scanner is configured to identify a file path for each source code file identified from the assembly. The file path is identified within the assembly metadata. The metadata-scoped code scanner is further configured to identify the set of source code files within a code repository, in response to identifying the file paths from the assembly metadata. The metadata-scoped code scanner is further configured to scan the set of source code files to identify potential code vulnerabilities in the set of source code files. The scan omits files in the code repository that were not identified within the assembly metadata. A functionality of the computer is improved by omitting others of the set of source code files that were not identified based on the file list.

As used herein, "a set of" when used with reference to items means one or more items. For example, a set of source code files is one or more source code files.

Figure 1:
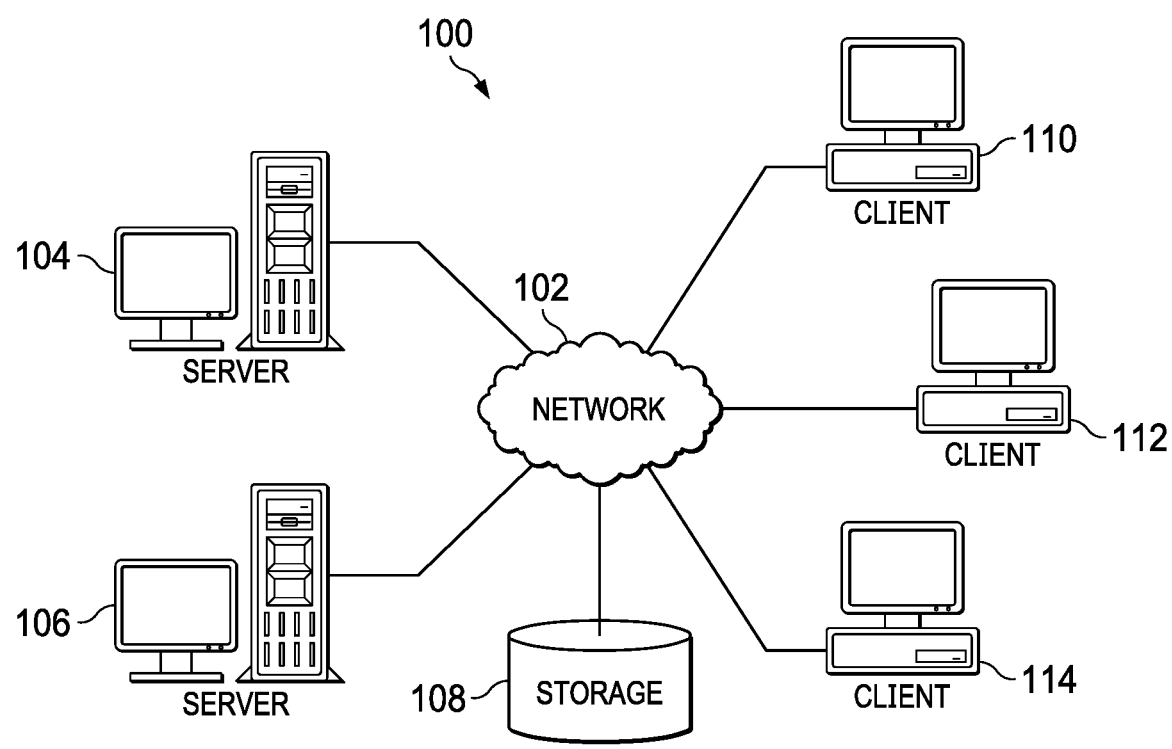
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices. S In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
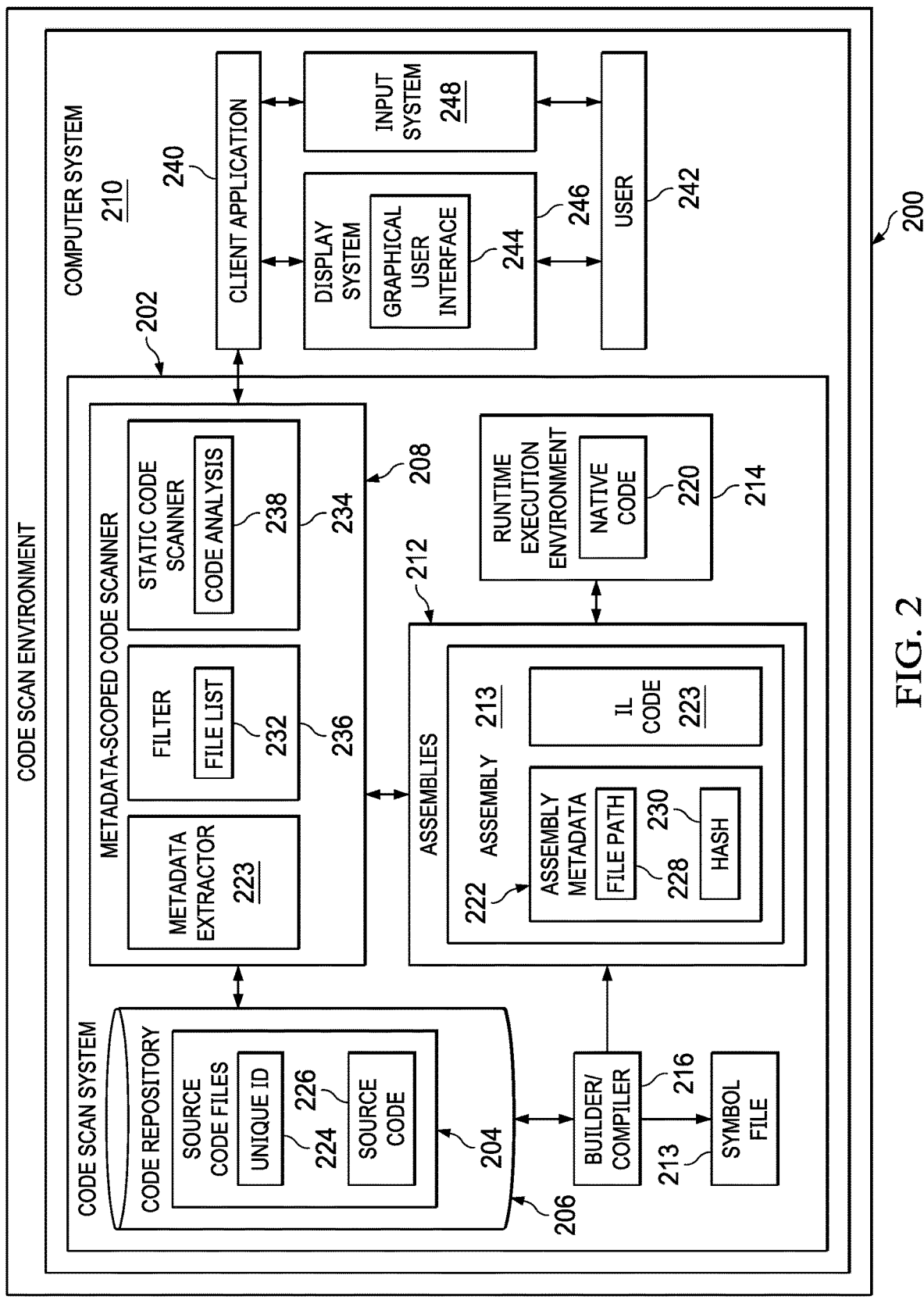
FIG. 2 is a block diagram of a code scanning environment in accordance with an illustrative embodiment.

With reference now to FIG. 2, a block diagram of a code scan environment is depicted in accordance with an illustrative embodiment. In this illustrative example, code scan environment 200 includes components that can be implemented in hardware such as the hardware shown in network data processing system 100 in FIG. 1.

In this illustrative example, code scan system 202 in code scan environment 200 can operate to process a set of source code files 204. As depicted, source code files 204 are stored in code repository 206, which may take the form of a database. In the illustrative example, a database is an organized collection of information that is stored and accessed by computing devices such as a server, a work station, a laptop, a mobile phone, or some other suitable type of device. In some cases, a database may also include database management software that is used to interact with end-users and applications to access the collection of information.

In this illustrative example, code scan system 202 includes metadata-scoped code scanner 208 in computer system 210. Metadata-scoped code scanner 208 operates to process source code files 204.

Metadata-scoped code scanner 208 can be implemented in software, hardware, firmware, or a combination thereof. When software is used, the operations performed by metadata-scoped code scanner 208 can be implemented in program code configured to run on hardware, such as a processor unit. When firmware is used, the operations performed by metadata-scoped code scanner 208 can be implemented in program code and data and stored in persistent memory to run on a processor unit. When hardware is employed, the hardware may include circuits that operate to perform the operations in metadata-scoped code scanner 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium may be a network. The data processing systems may be selected from at least one of a computer, a server computer, a tablet, or some other suitable data processing system.

In this illustrative example, metadata-scoped code scanner 208 in computer system 210 receives a set of assemblies 212. Each one of assemblies 212 is a collection of data types and resource information that work together to build applications. Each one of assemblies 212 forms a logical unit of functionality that contains code which is executed by runtime execution environment 214. Assemblies 212 can include executable process assemblies (an executable file) and library assemblies (a dynamic link library) that can run directly without the need for any other programs (.exe files) and libraries (.dll files) for use by other applications.

In this illustrative example, builder/compiler 216 generates assemblies 212 from one or more of source code files 204, each comprising unique ID 224 generated by builder/compiler 216 and source code 226. During the compile time, builder/compiler 216 converts source code 226 into Intermediate Language (IL) code 218. IL code 218 is a CPU-independent set of instructions that can be efficiently converted to native code 220 by runtime execution environment 214.

In this illustrative example, each of assemblies 212 contains one or more program files and assembly metadata 222. Builder/compiler 216 generates assembly metadata 222 in conjunction with IL code 218. As used herein, metadata is binary information which describes the characteristics of the associated one of assemblies 212. This information can include a description of the assembly, data types and members with their declarations and implementations, references to other data types and members, and security permissions, as well as any other data that runtime execution environment 214 needs for execution.

Runtime execution environment 214 works as a layer between operating systems and the applications. Runtime execution environment 214 converts IL code 218 into native code 220 and then executes a program. Runtime execution environment 214 may also be referred to as a managed environment, because it also controls the interaction with the operating system during the execution of the program. During the execution of the program, runtime execution environment 214 manages memory, thread execution, Garbage Collection (GC), Exception Handling, Common Type System (CTS), code safety verifications, and other system services.

In this illustrative example, runtime execution environment 214 converts IL code 218 to native code 220 on demand at application runtime. IL code 218 is compiled only when it is needed; that is, runtime execution environment 214 converts the appropriate instructions when each function is called.

When code is executed, runtime execution environment 214 loads assembly metadata 222 into a memory. Runtime execution environment 214 references assembly metadata 222 to discover information about IL code 218 in assembly 213 of assemblies 212. Runtime execution environment 214 uses assembly metadata 222 to convert IL code 218 to native code 220 on demand at application runtime, eliminating the need for Interface Definition Language (IDL) files, header files, or some other external method of component reference.

In this illustrative example, metadata extractor 223 extracts assembly metadata 222 from an assembly 213 of assemblies 212. In this illustrative example, metadata 222 generated by builder/compiler 216 includes both the original, file path 228 to source code files 204 that were compiled, and hash 230 of source code files 204. By extracting assembly metadata 222, including file path 228, metadata-scoped code scanner 208 in computer system 210 identifies source code files 204 used to build assembly 213 in assemblies 212.

In this illustrative example, metadata-scoped code scanner 208 in computer system 210 generates file list 232 based on the original, file path 228 extracted from assembly metadata 222. Static code scanner 234 uses file list 232 to narrow the scope of a given scan to exactly those files that contributed to the build output of builder/compiler 216.

In this illustrative example, metadata-scoped code scanner 208 identifies the one or more source code files 204 from a set of source code files 204 in code repository 206 based on file list 232. Metadata-scoped code scanner 208 uses file list 232 as a de facto filter 236 to narrow the scope of a given scan of code repository 206 by static code scanner 234.

Static code scanner 234 is a code analysis tool that identifies possible vulnerabilities within static, non-running source code 226. Static code scanner 234 uses techniques such as taint analysis and data flow analysis to identify possible vulnerabilities such as buffer overflows and SQL injection flaws.

In this illustrative example, metadata-scoped code scanner 208 in computer system 210 performs code analysis 238, scanning the set of source code files 204 to identify potential code vulnerabilities in the set of source code files 204. By omitting source code files 204 in code repository 206 from those that were not identified based on file list 232, metadata-scoped code scanner 208 improves a code scanning functionality of computer system 210, as compared to other static scanners known in the art.

Metadata-scoped code scanner 208 sends code analysis 238 to client application 240 in computer system 210. In this example, code analysis 238 can be displayed to user 242 on graphical user interface 244 displayed on display system 246 for computer system 210. User 242 interacts with code analysis 238 using input system 248. This interaction includes at least one of confirming source code files 204 scanned by metadata-scoped code scanner 208, or correcting one or more of source code files 204 scanned by metadata-scoped code scanner 208.

In one illustrative example, one or more technical solutions are present that overcome a technical problem with the time and effort needed to scan source code files. As a result, the illustrative example provides one or more technical solutions with the technical effect using metadata extracted from compiled assemblies of source code documents to automatically narrow the scope of a given scan of a code repository. The illustrative example provides one or more technical solutions with a technical effect in which extracted metadata is used to filter source code files within a code repository. As a result, source code files that are not used in a particular assembly do not have to be analyzed for potential code vulnerabilities.

Computer system 210 can be configured to perform at least one of the steps, operations, or actions described in the different illustrative examples using software, hardware, firmware, or a combination thereof. As a result, computer system 210 operates as a special purpose computer system in which metadata-scoped code scanner 208 in computer system 210 enables static code analysis in which a given scan of code repository can be automatically scoped according to source code files that are actually used in a particular assembly based on metadata extracted from compiled assemblies of source code documents. In particular, metadata-scoped code scanner 208 transforms computer system 210 into a special purpose computer system as compared to currently available general computer systems that do not have metadata-scoped code scanner 208.

In the illustrative example, the use of metadata-scoped code scanner 208 in computer system 210 integrates processes into a practical application that increases the performance of computer system 210. In other words, metadata-scoped code scanner 208 in computer system 210 is directed to a practical application of processes integrated into metadata-scoped code scanner 208 in computer system 210 that filters source code files within a code repository for static code analysis. The practical application of processes include receiving a set of assemblies, wherein each assembly was generated from one or more source code files; identifying a unique identifier for each assembly, where in the unique identifier is identified within metadata of the assembly; generating a file list from the identified unique identifiers; identifying the one or more source code files from a set of source code files based on the file list; and scanning only the one or more source code files to identify potential code vulnerabilities, wherein a functionality of the computer is improved by omitting others of the set of source code files that were not identified based on the file list.

In this manner, metadata-scoped code scanner 208 in computer system 210 provides a practical application of the invention filtering source code files within a code repository for static code analysis based on metadata extracted from compiled assemblies of source code documents such that the functioning of computer system 210 is improved. Metadata-scoped code scanner 208 imparts enhanced functionality provided to computer system 210 by the use of metadata extracted from compiled assemblies of source code documents to automatically limit the scope of static code analysis. Prior art computer systems that do not include metadata-scoped code scanner 208 do not use extracted metadata to unconventionally determine the scope of static code analysis. Therefore, metadata-scoped code scanner 208 provides a particular improvement in the functioning of computer system 210 that amounts to more than a routine activity of commercial network management software, utilizing "off-the-shelf components" that "include only generic activities of servers."

Furthermore, metadata-scoped code scanner 208 enables additional improvements outside of a static vulnerability code scan. For example, assembly metadata 222 extracted from assemblies 212 can be utilized during mergers and acquisitions of different organizations to better understand exactly what products a company is using in production. Assembly metadata 222 extracted from assemblies 212 could be particularly useful in external audits of large applications, wherein the deployed metadata could be used to reverse to the source code repository files, then check for changes. Additionally, assembly metadata 222 extracted from assemblies 212 could help provide test isolation and tighter focus for qualitative analysis testing by being able to narrow the scope of deployed or packaged changes.

The illustration of code scan environment 200 and the different components in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
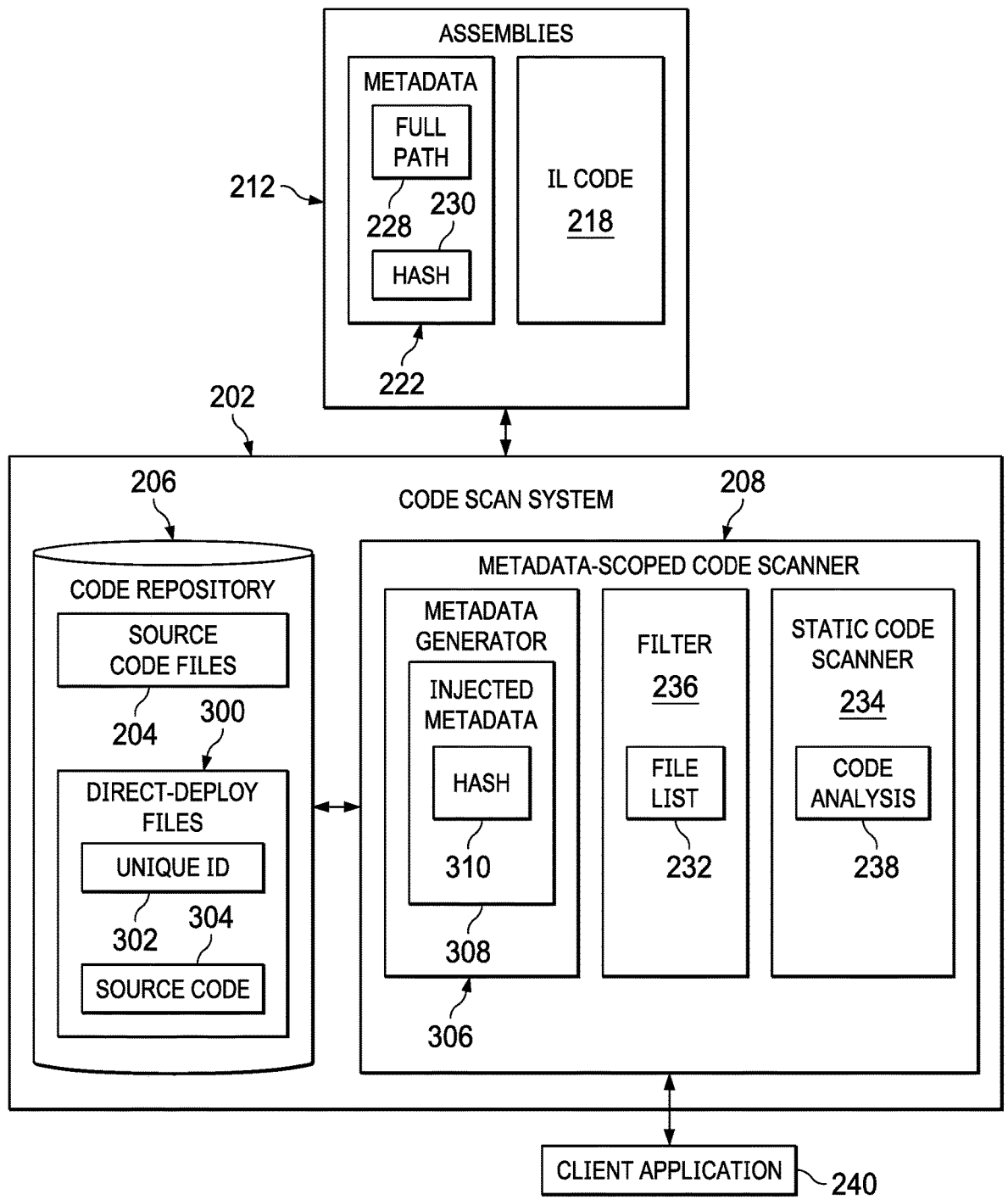
FIG. 3 is an illustration of a dataflow for scanning code in accordance with an illustrative embodiment.

With reference next to FIG. 3, an illustration of a data flow for scanning code is depicted in accordance with an illustrative embodiment. In the illustrative examples, the same reference numeral may be used in more than one figure. This reuse of a reference numeral in different figures represents the same element in the different figures.

In this illustrative example, code repository 206 includes direct-deploy files 300. Direct-deploy files 300 are files that are not compiled, for example, by builder/compiler 216 of FIG. 2, but are actually deployed directly outside of the build/compile process to provide functionality for an application. Similar to source code files 204, direct-deploy files 300 include unique ID 302 and source code 304.

In this illustrative example, metadata-scoped code scanner 208 includes metadata generator 306. Metadata generator 306 creates injected metadata 308 for direct-deploy files 300. In this illustrative example, metadata generator 306 generates injected metadata 308, including hash 310, from both the packaged assembly in assemblies 212 and direct-deploy files 300. Injected metadata 308 is metadata that is not automatically generated by the typical build process. Injected metadata 308, including hash 310, acts as a "shim pointer" back to the original location of direct-deploy files 300 in code repository 206.

Figure 4:
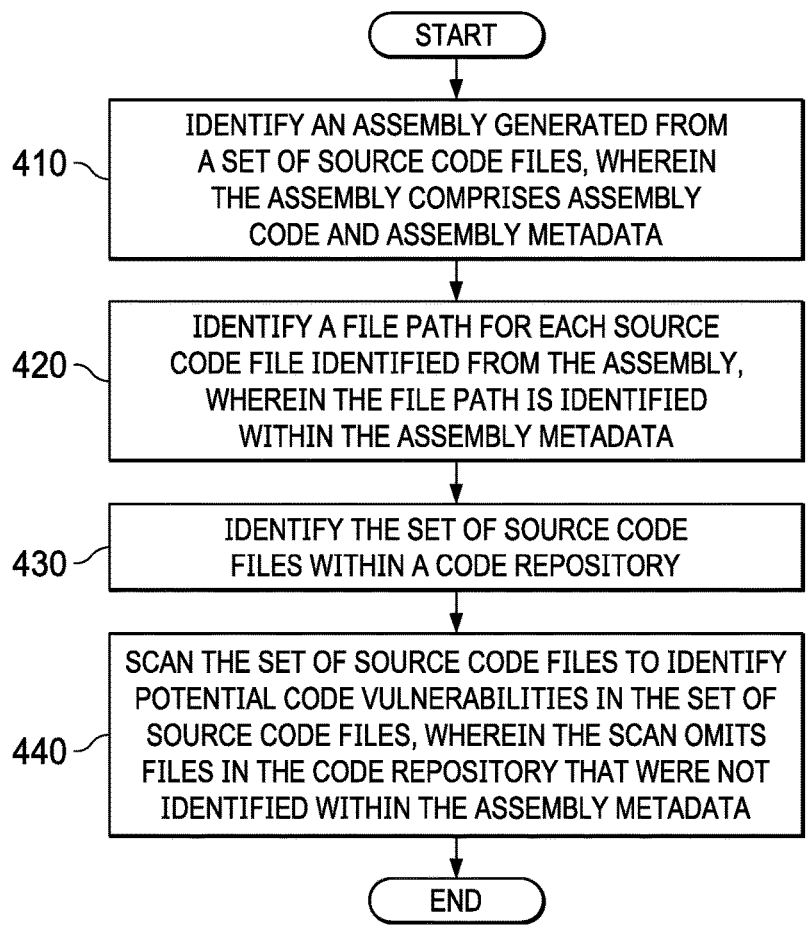
FIG. 4 is a flowchart of a process for scanning code in accordance with an illustrative embodiment.

With reference to FIG. 4, a flowchart of a process for scanning code is depicted in accordance with an illustrative embodiment. The process in FIG. 4 can be implemented in hardware, software, or both. When implemented in software, the process can take the form of program code that is run by one of more processor units located in one or more hardware devices in one or more computer systems. For example, the process can be implemented in metadata-scoped code scanner 208 in computer system 210 in FIG. 2.

The process begins by identifying an assembly (step 410). Each assembly was generated from one or more source code files, such as one or more of source code files 204 of FIG. 2. The assembly comprises assembly code and assembly metadata.

The process identifies a file path for each source code file identified from the assembly (step 420). The file path is identified within metadata of the assembly, such as assembly metadata 222 of assemblies 212, both shown in block form in FIG. 2.

Responsive to identifying the file paths from the assembly metadata, the process identifies one or more source code files within a code repository (step 430).

The process scans the set of source code files to identify potential code vulnerabilities in the set of source code files (step 440), with the process terminating thereafter. The scan omits files in the code repository that were not identified within the assembly metadata. A functionality of the computer is improved by omitting others of the plurality of source code files that were not identified based on the file list.

Figure 5:
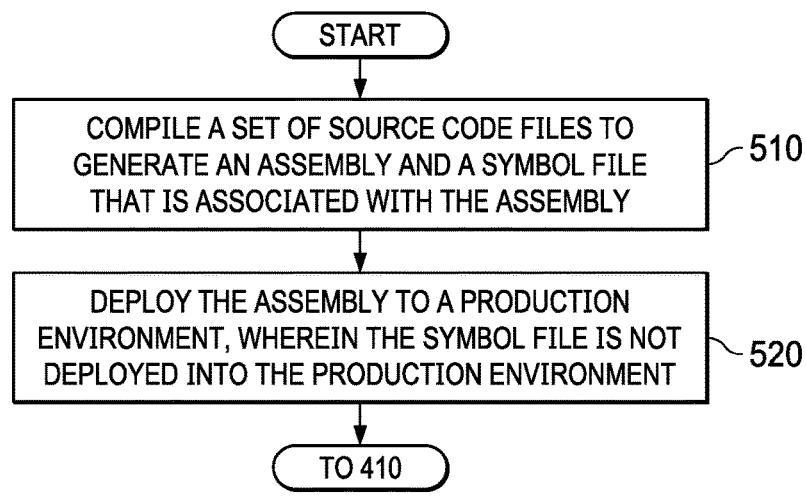
FIG. 5 is a flowchart of a process for deploying an assembly for code scanning in accordance with an illustrative embodiment.

With reference to FIG. 5, a flowchart of a process for deploying an assembly for code scanning is depicted in accordance with an illustrative embodiment.

The process begins by compiling a set of source code files to generate an assembly and a symbol file that is associated with the assembly (step 510). The assembly can be, for example, and assembly in assemblies 212 of FIG. 2. The symbol file can be, for example, symbol file 213 of FIG. 2.

The process deploys the assembly to a production environment (step 520). However, the symbol file is not deployed into the production environment. The process can then continue to step 410 of FIG. 4.

Figure 6:
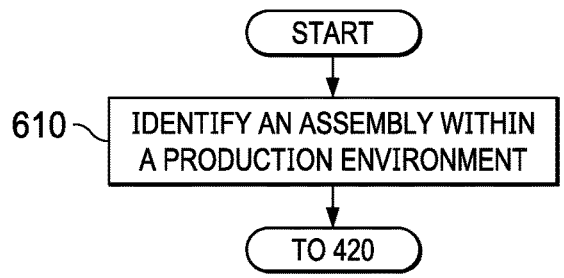
FIG. 6 is a flowchart of a process for identifying an assembly generated from a set of source code files in accordance with an illustrative embodiment.

With reference next to FIG. 6, a flowchart of a process for identifying an assembly generated from a set of source code files is depicted in accordance with an illustrative example. The process of FIG. 6 is one embodiment of the process step shown in step 410 of FIG. 4. The process of FIG. 6 can be implemented in conjunction with the process of FIG. 5.

The process identifies an assembly within a production environment (step 610). The process can then continue to step 420 of FIG. 4.

Figure 7:
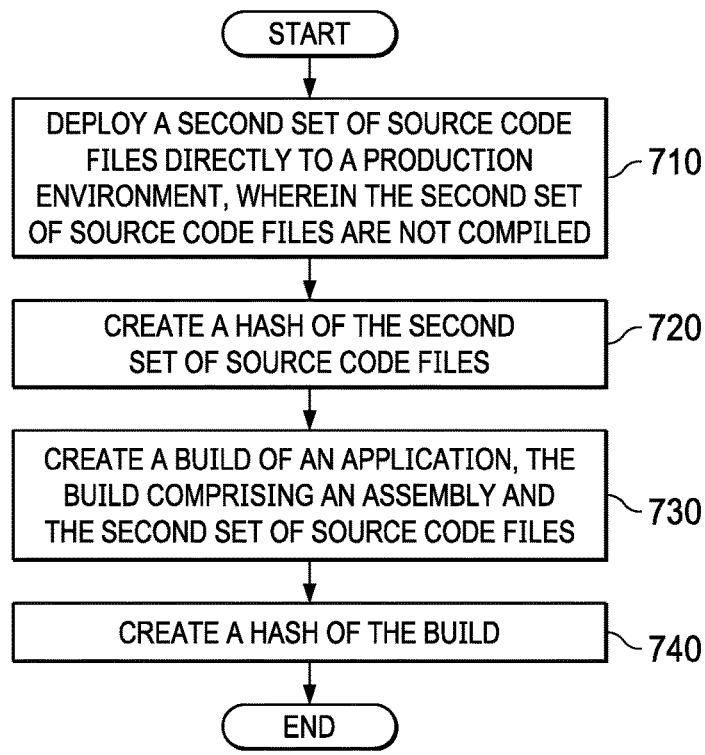
FIG. 7 is a flowchart of a process for generating injected metadata in accordance with an illustrative embodiment.

With reference next to FIG. 7, a flowchart of a process for generating injected metadata is depicted in accordance with an illustrative example. The process of FIG. 7 is a software process that can be implemented in one or more software components, such as metadata generator 306 of FIG. 3.

The process begins by deploying a second set of source code files directly to a production environment (step 710). The second set of source code files can be, for example, direct-deploy files 300 of FIG. 3. The second set of source code files are deployed directly to the production environment, and are not compiled, for example, by builder/compiler 216 of FIG. 2.

The process creates a hash of the set of second source code files (step 720). The process then creates a build of the application (step 730). The build comprises the assembly and the second set of source code files.

The process creates a hash of the build (step 740), with the process terminating thereafter. A metadata-scoped code scanner, such as metadata-scoped code scanner 208 of FIG. 2, can utilize the hashes as a "shim pointer" to identify the original file location of the second set of source code files in a code repository.

Figure 8:
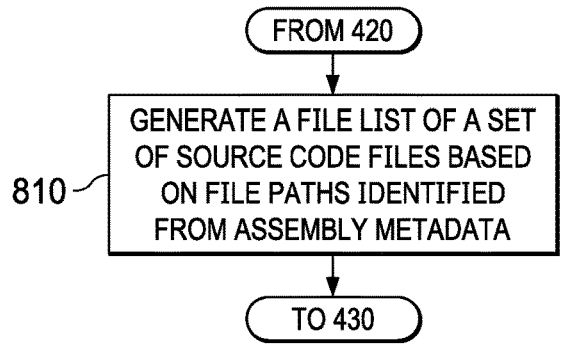
FIG. 8 is a flowchart of a process for generating a list of source code files in accordance with an illustrative embodiment.

With reference next to FIG. 8, a flowchart of a process for generating a list of source code files is depicted in accordance with an illustrative example. The process of FIG. 8 can be implemented in conjunction with process 400 of FIG. 4.

Continuing from step 420 of FIG. 4, the process generates a list of the code files based on file paths identified from assembly metadata (step 810). The process can then continue to step 430 of FIG. 4.

The list of source code files can be used to import additional functionality to a metadata-scoped code scanner, or can be exported to other applications for other purposes outside of a static vulnerability code scan. For example, the generated list of source code files can be used during valuation and acquisitions to better understand exactly what products a company is using in production (i.e. assets). In another example, the generated list of source code files can be used in external audits of large applications, automatically checking for consistency between the application and the source code repository files determined from the extracted metadata and deployed metadata. In another example, the generated list of source code files can be used for test isolation purposes by narrowing the scope of testing to the deployed (or packaged) changes to the application, thus helping to provide tighter focus for quality assurance.

Figure 9:
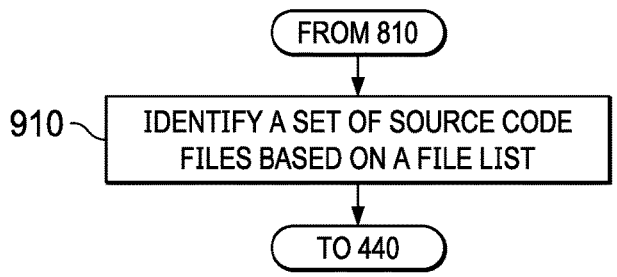
FIG. 9 is a flowchart of a process for identifying an assembly generated from a set of source code files in accordance with an illustrative embodiment.

With reference next to FIG. 9, a flowchart of a process for identifying an assembly generated from a set of source code files is depicted in accordance with an illustrative example. The process of FIG. 9 is one embodiment of the process step shown in step 430 of FIG. 4. Process 900 can be implemented in conjunction with the process of FIG. 8.

The process identifies a set of source code files based on a file list (step 910). The process can then continue to step 440 of FIG. 4.

Figure 10:
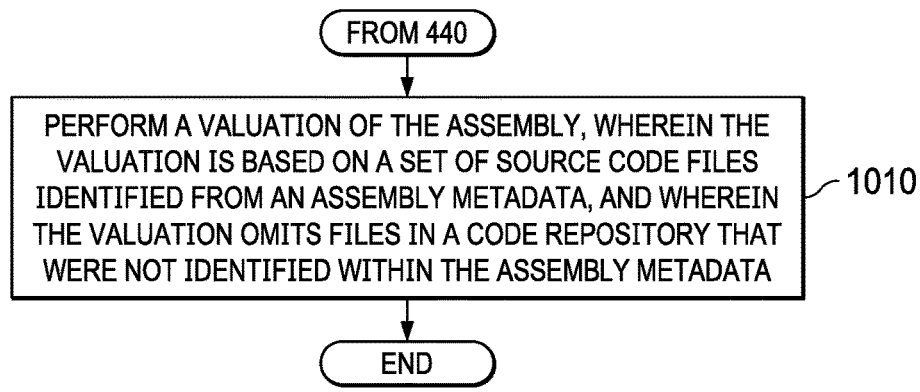
FIG. 10 is a flowchart of a process for performing an asset valuation based on a set of source code files in accordance with an illustrative embodiment.

With reference next to FIG. 10, a flowchart of a process for performing an asset valuation based on a set of source code files is depicted in accordance with an illustrative example. The process in FIG. 10 can be implemented in conjunction with the process of FIG. 8.

Continuing from step 440, the process performs a valuation of an assembly (step 1010), with the process terminating thereafter. The valuation is based on the set of source code files identified from the assembly metadata. The valuation omits files in the code repository that were not identified within the assembly metadata.

Figure 11:
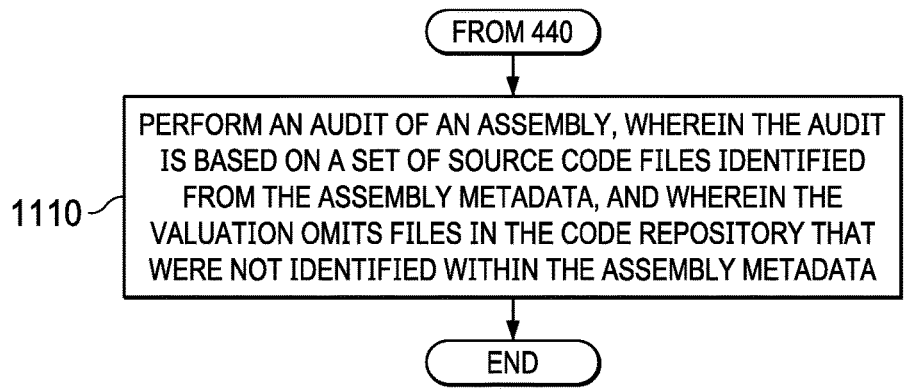
FIG. 11 is a flowchart of a process for performing an audit of a software assembly based on a set of source code files in accordance with an illustrative embodiment.

With reference next to FIG. 11, a flowchart of a process for performing an audit of a software assembly based on a set of source code files is depicted in accordance with an illustrative example. The process in FIG. 11 can be implemented in conjunction with the process of FIG. 8.

Continuing from step 440, the process performs an audit of an assembly (step 1110), with the process terminating thereafter. The audit is based on the set of source code files identified from the assembly metadata. The audit omits files in the code repository that were not identified within the assembly metadata.

The flowcharts and block diagrams in the different depicted embodiments illustrate the architecture, functionality, and of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
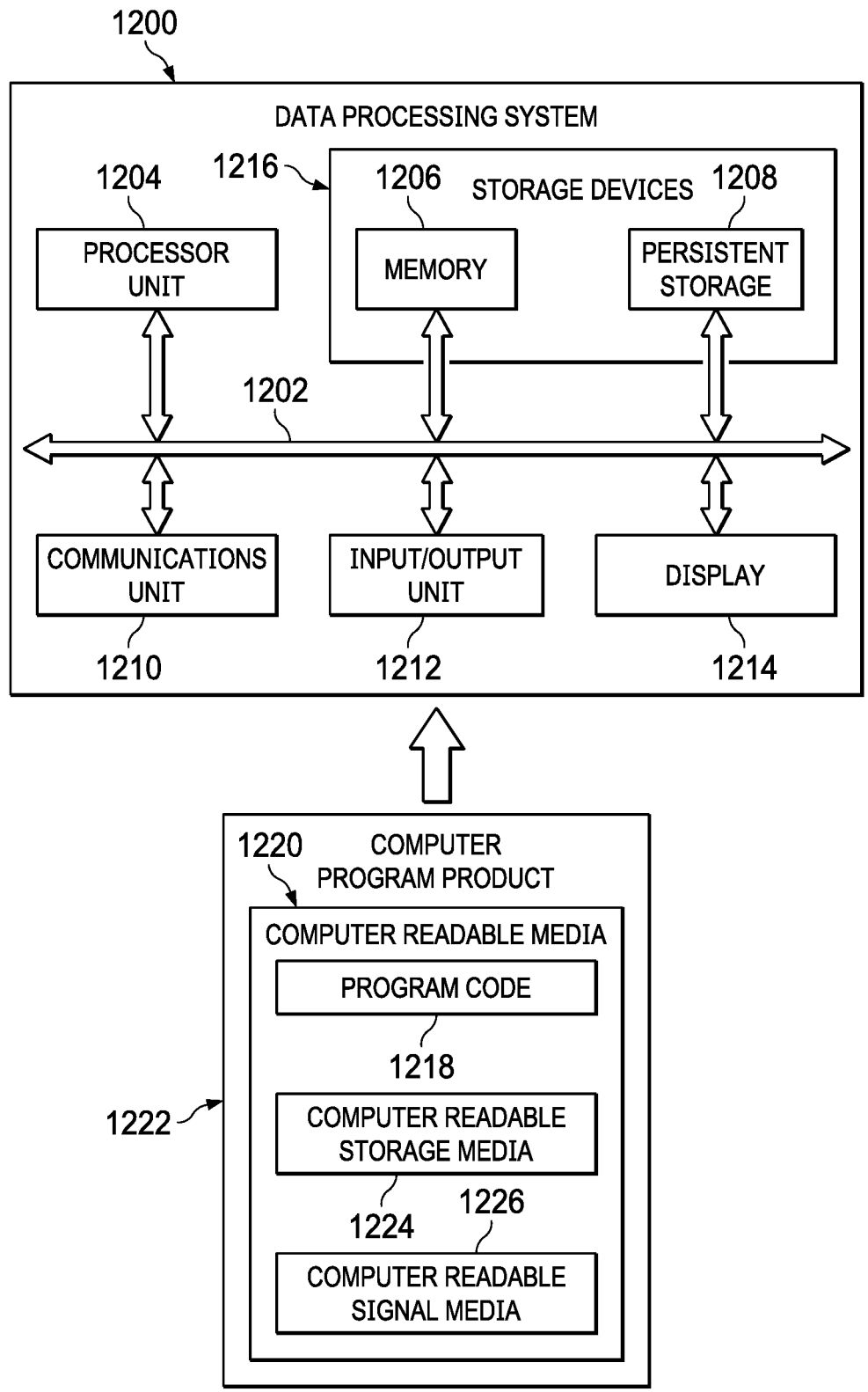
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, and client devices 110 in FIG. 1. Data processing system 1200 can also be used to implement computer system 210 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1200 are not meant to provide architectural limitations to the manner in which different embodiments can be implemented. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 1206, or portions thereof, may be incorporated in processor unit 1204 in some illustrative examples. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for scanning source code files included in an application, the method comprising:
   compiling a set of source code files to generate an assembly, wherein the assembly further contains assembly code and assembly metadata;
   deploying the assembly and a second set of source code files directly to a production environment, wherein the second set of source code files are direct-deploy files that are not compiled;
   building the application, by the production environment, from the assembly and the second set of source code files;
   subsequent to the building, identify potential code vulnerabilities within the application build that could affect the functionality of the production environment by:
      identifying assembly for the application build within the production environment;
      identifying a file path for each source code file of a plurality of source code files identified from the assembly metadata of the assembly;
      responsive to identifying the file paths from the assembly metadata, identifying the set of source code files within a code repository based on their respective file path identified from the assembly metadata, wherein the code repository comprises the set of source code files that contribute to the assembly output of the compiler and direct-deploy files that are not compiled; and
      scanning the set of source code files to identify potential code vulnerabilities in the set of source code files, wherein a functionality of the production environment is improved by omitting others of the second set of source code files that were deployed directly outside of compiling process to provide functionality for the application.

2. The method of claim 1, further comprising:
   wherein compiling the set of source code files to generate the assembly further comprises generating a symbol file that is associated with the assembly,
   wherein the symbol file is not deployed into the production environment.

3. The method of claim 2, wherein the set of source code files is a first set of source code files, the method further comprising:
   creating a hash of the second set of source code files; and
   creating a hash of the build.

4. The method of claim 1, further comprising:
   generating a file list of the set of source code files based on the file paths identified from the assembly metadata.

5. The method of claim 4, wherein the step of identifying the set of source code files further comprises:
   identifying the identifying the set of source code files based on the file list.

6. The method of claim 4, further comprising:
   performing a valuation of the assembly, wherein the valuation is based on the set of source code files identified from the assembly metadata, and wherein the valuation omits files in the code repository that were not identified within the assembly metadata.

7. The method of claim 4, further comprising:
   performing an audit of the assembly, wherein the audit is based on the set of source code files identified from the assembly metadata, and wherein the audit omits files in the code repository that were not identified within the assembly metadata.

8. A computer system for scanning source code files included in an application, the computer system comprising:
   a code scan system comprising a hardware processor and memory to perform the steps of:
   compiling a set of source code files to generate an assembly, wherein the assembly further contains assembly code and assembly metadata;
   deploying the assembly and a second set of source code files directly to a production environment, wherein the second set of source code files are direct-deploy files that are not compiled;
   building the application, by the production environment, from the assembly and the second set of source code files;
   subsequent to the building, identify potential code vulnerabilities within the application build that could affect the functionality of the production environment by:
      identifying assembly for the application build within the production environment;
      identifying a file path for each source code file of a plurality of source code files identified from the assembly metadata of the assembly;
      responsive to identifying the file paths from the assembly metadata, identifying the set of source code files within a code repository based on their respective file path identified from the assembly metadata, wherein the code repository comprises the set of source code files that contribute to assembly output of the compiler and direct-deploy files that are not compiled; and
      scanning the set of source code files to identify potential code vulnerabilities in the set of source code files, wherein a functionality of the production environment is improved by omitting others of the second set of source code files that were deployed directly outside of compiling process to provide functionality for the application.

9. The computer system of claim 8, wherein the code scan system further comprises:
   wherein the compiling the set of source code files to generate the assembly further comprises generating a symbol file that is associated with the assembly,
   wherein the symbol file is not deployed into the production environment.

10. The computer system of claim 9, wherein the set of source code files is a first set of source code files, wherein the code scan system further comprises steps to:
    generate a hash of the second set of source code files; and
    generate a hash of the build.

11. The computer system of claim 8, wherein the code scan system further comprises steps to:
   generate a file list of the set of source code files based on the file paths identified from the assembly metadata.

12. The computer system of claim 11, wherein the step of identifying the set of source code files further comprises:
   identifying the identifying the set of source code files based on the file list.

13. The computer system of claim 12, wherein the code scan system further comprises steps to:
   perform a valuation of the assembly, wherein the valuation is based on the set of source code files identified from the assembly metadata, and wherein the valuation omits files in the code repository that were not identified within the assembly metadata.

14. The computer system of claim 12, wherein the code scan system further comprises steps to:
   perform an audit of the assembly, wherein the audit is based on the set of source code files identified from the assembly metadata, and wherein the audit omits files in the code repository that were not identified within the assembly metadata.

15. A computer program product for scanning source code files included in an application, the computer program product comprising:
   a computer-readable storage media having program code stored thereon;
   program code, stored on the computer-readable storage media, for compiling a set of source code files to generate an assembly, wherein the assembly further contains assembly code and assembly metadata;
   program code, stored on the computer-readable storage media, for deploying the assembly and a second set of source code files directly to a production environment, wherein the second set of source code files are direct-deploy files that are not compiled;
   program code, stored on the computer-readable storage media, for building the application, by the production environment, from the assembly and the second set of source code files;
   program code, stored on the computer-readable storage media, for subsequent to the building, identifying potential code vulnerabilities within the application build that could affect the functionality of the production environment by:
      identifying assembly for the application build within the production environment;
      identifying a file path for each source code file of a plurality of source code files identified from the assembly metadata of the assembly;
      responsive to identifying the file paths from the assembly metadata, identifying the set of source code files within a code repository based on their respective file path identified from the assembly metadata, wherein the code repository comprises the set of source code files that contribute to the assembly output of the compiler and direct-deploy files that are not compiled; and
      scanning the set of source code files to identify potential code vulnerabilities in the set of source files, wherein a functionality of the production environment is improved by omitting others of the second set of source code files that were deployed directly outside of compiling process to provide functionality for the application.

16. The computer program product of claim 15, wherein the program code further comprises:
   wherein compiling the set of source code files to generate the assembly further comprises generating a symbol file that is associated with the assembly, wherein the symbol file is not deployed into the production environment.

17. The computer program product of claim 16, wherein the set of source code files is a first set of source code files, wherein the program code further comprises:
   program code, stored on the computer-readable storage media, for generating a hash of the second set of source code files; and
   program code, stored on the computer-readable storage media, for generating a hash of the build.

18. The computer program product of claim 15, wherein the program code further comprises:
   program code, stored on the computer-readable storage media, for generating a file list of the set of source code files based on the file paths identified from the assembly metadata.

19. The computer program product of claim 18, wherein the program code for the set of source code files further comprises:
   program code, stored on the computer-readable storage media, for identifying the identifying the set of source code files based on the file list.

20. The computer program product of claim 18, wherein the program code further comprises:
   program code, stored on the computer-readable storage media, for performing a valuation of the assembly, wherein the valuation is based on the set of source code files identified from the assembly metadata, and wherein the valuation omits files in the code repository that were not identified within the assembly metadata.

21. The computer program product of claim 18, wherein the program code further comprises:
   program code, stored on the computer-readable storage media, for performing an audit of the assembly, wherein the audit is based on the set of source code files identified from the assembly metadata, and wherein the audit omits files in the code repository that were not identified within the assembly metadata.

* * * * *